(12) United States Patent
Bhargava et al.

(10) Patent No.: US 11,405,377 B2
(45) Date of Patent: Aug. 2, 2022

(54) SECURE ENDPOINT AUTHENTICATION CREDENTIAL CONTROL

(71) Applicant: JumpCloud, Inc., Louisville, CO (US)

(72) Inventors: Rajat Bhargava, Boulder, CO (US); Peter Gengler, Boulder, CO (US); Jacob Beck, Broomfield, CO (US); Greg Keller, Boulder, CO (US); Tae Kim, Boulder, CO (US)

(73) Assignee: JumpCloud, Inc., Louisville, CO (US)

( * ) Notice: Subject to any disclaimer, the term of this patent is extended or adjusted under 35 U.S.C. 154(b) by 0 days.

(21) Appl. No.: 17/070,684

(22) Filed: Oct. 14, 2020

(65) Prior Publication Data

US 2021/0029109 A1  Jan. 28, 2021

Related U.S. Application Data

(63) Continuation of application No. 15/901,734, filed on Feb. 21, 2018, now Pat. No. 10,848,478.

(51) Int. Cl.

| G06F 21/30 | (2013.01) |
|---|---|
| G06F 21/41 | (2013.01) |
| H04L 9/40 | (2022.01) |
| H04L 67/00 | (2022.01) |

(52) U.S. Cl.
CPC .......... *H04L 63/0815* (2013.01); *H04L 63/08* (2013.01); *G06F 21/30* (2013.01); *G06F 21/41* (2013.01); *H04L 29/06047* (2013.01)

(58) Field of Classification Search
CPC .............. H04L 63/0815; H04L 63/08; H04L 29/06047; H04L 69/40; H04L 67/025; G06F 21/30; G06F 21/41; G06F 21/6218; G06F 21/31; H04W 12/06; H04W 12/0608
See application file for complete search history.

(56) References Cited

U.S. PATENT DOCUMENTS

| 7,882,538 | B1 | 2/2011 | Palmer |
|---|---|---|---|
| 8,185,933 | B1 | 5/2012 | Palmer |
| 8,291,468 | B1 | 10/2012 | Chickering |
| 8,819,795 | B2 | 8/2014 | Hitchcock et al. |
| 8,910,155 | B1 | 12/2014 | Sobel et al. |
| 9,124,636 | B1 * | 9/2015 | Rathor ................ H04L 63/1433 |
| 9,723,019 | B1 | 8/2017 | Rathor |
| 9,774,588 | B2 | 9/2017 | Nethi et al. |
| 9,887,979 | B1 | 2/2018 | Pandita et al. |
| 10,321,318 | B2 * | 6/2019 | Raleigh ................ G06Q 40/00 |
| 10,645,073 | B1 | 5/2020 | Agarmore et al. |
| 2009/0006844 | A1 | 1/2009 | Wing et al. |

(Continued)

*Primary Examiner* — Techane Gergiso
(74) *Attorney, Agent, or Firm* — Holland & Hart LLP

(57) ABSTRACT

Methods, systems, and devices for secure endpoint authentication credential control are described. An endpoint agent may receive an indication from an operating system of an endpoint device that the operating has received authentication credentials from a user. The endpoint agent may be housed in the endpoint device, and may detect a change between the received set of authentication credentials and a previous version of authentication credentials. Based on this detection, the endpoint agent may transmit the received authentication credentials to a central server. The central server may transmit the authentication credentials to an information technology (IT) resource which requires user authentication prior to granting access to a user.

18 Claims, 6 Drawing Sheets

(56) References Cited

U.S. PATENT DOCUMENTS

| | | |
|---|---|---|
| 2009/0158407 A1 | 6/2009 | Nicodemus et al. |
| 2009/0271850 A1* | 10/2009 | Hoppe .................... G06F 21/31 |
| | | 726/6 |
| 2010/0071024 A1 | 3/2010 | Eyada |
| 2010/0125897 A1 | 5/2010 | Jain et al. |
| 2013/0198822 A1* | 8/2013 | Hitchcock ............. G06F 21/335 |
| | | 726/5 |
| 2013/0198824 A1 | 8/2013 | Hitchcock et al. |
| 2016/0149901 A1 | 5/2016 | Liu et al. |
| 2016/0323318 A1* | 11/2016 | Terrill ................. H04L 63/0227 |
| 2017/0142094 A1 | 5/2017 | Doitch et al. |
| 2017/0169227 A1 | 6/2017 | Rajcan et al. |
| 2018/0007046 A1* | 1/2018 | Oberheide ............ H04L 63/205 |
| 2018/0097840 A1* | 4/2018 | Murthy ................... H04L 63/02 |
| 2018/0159844 A1* | 6/2018 | Barfonchovski ... H04L 63/0823 |
| 2018/0159845 A1 | 6/2018 | Aronov et al. |
| 2018/0176210 A1 | 6/2018 | Comay et al. |
| 2018/0191701 A1 | 7/2018 | Kong et al. |
| 2018/0332079 A1* | 11/2018 | Ashley ................ H04L 63/0227 |

\* cited by examiner

SECURE ENDPOINT AUTHENTICATION CREDENTIAL CONTROL

CROSS REFERENCES

The present applicant for patent is a continuation of U.S. patent application Ser. No. 15/901,734 by Bhargava et al., entitled "Secure Endpoint Authentication Credential Control", filed Feb. 21, 2018, assigned to the assignee hereof, and expressly incorporated by reference in its entirety herein.

BACKGROUND

As users within organizations use more information technology (IT) services, a challenge for the user, and the organization, may be to set strong authentication credentials for each IT resource. Today, end users may need to set unique credentials on each IT resource, such as endpoint device systems (e.g., a laptop/desktop), servers, applications, networks, file servers, etc., that the user may have access to within the organization.

This not only becomes complicated when trying to set and update credentials, but in applying the credentials as well. If a user wishes to initially set or update his or her credentials, the user may be required to individually access numerous IT resources and set or update their credentials for each of these IT resources. Furthermore, different IT resources may implement different procedures for updating authentication credentials, which may further complicate the process of setting or updating authentication credentials for users and incentivize the use of weak authentication credentials.

Previous solutions for authentication credential management have proven inefficient and/or insecure. For example, a web-based credential control system may require a user to visit a website in order to update/set authentication credentials for IT resources. However, the website itself may have security vulnerabilities that allow malicious entities to compromise the user's authentication credentials. Another attempt at authentication credential management may allow for a closed network infrastructure to federate the authentication credentials for IT resources through the closed network. However, the credential federation in this situation may be limited to those IT resources managed or controlled within the closed network. In other words, IT resources managed by third-party entities residing outside of the closed network may not have their authentication credentials for the user updated or set based on this method.

Techniques for managing user authentication credentials for IT resources, regardless of the entities managing the IT resources, while maintaining a high security level throughout the process, may increase efficiency and simplify user authentication credential management in a closed network environment.

SUMMARY

Methods, systems, and devices that support secure endpoint authentication credential control are described. Within a networked computing system, an endpoint agent may facilitate user authentication credential management for user access to IT resources. The endpoint agent, which may also be referred to as an agent, may be installed on an endpoint device which a user may have access to. The user may input authentication credentials into an operating system of the endpoint device in order to gain access to the endpoint device. The endpoint agent may receive an indication that authentication credentials have been inputted in the operating system, and may receive the authentication credentials from the operating system. The endpoint agent may detect a change between the received version of the authentication credentials and a previous version of the authentication credentials. Based on this detection, the endpoint agent may transmit the received authentication credentials to a central server of the network over a secure connection. The central server may then transmit the authentication credentials to various IT resources that may require user authentication prior to granting access to a user.

A method of secure credential management is described. The method may include receiving, by an endpoint agent running on an endpoint device, an indication from an operating system of the endpoint device that the operating system has received authentication credentials from a user, obtaining, by the endpoint agent, the authentication credentials from the operating system of the endpoint device, detecting, by the endpoint agent, a change between the authentication credentials obtained from the operating system and a previous version of the authentication credentials, transmitting the obtained set of authentication credentials over a secure connection to a central server based on the detected change, and wherein the endpoint agent is separate from the operating system.

A system for secure credential management is also described. The system may include a processor, memory in electronic communication with the processor, instructions stored in the memory and operable, when executed by the processor, implement an endpoint agent configured to: receive, by the endpoint agent, an indication from an operating system of the endpoint device that the operating system has received authentication credentials from a user, obtain, by the endpoint agent, the authentication credentials from the operating system of the endpoint device, detect, by the endpoint agent, a change between the authentication credentials obtained from the operating system and a previous version of the authentication credentials, transmit the obtained set of authentication credentials over a secure connection to a central server based on the detected change, and wherein the endpoint agent is separate from the operating system.

A non-transitory computer-readable medium for secure credential management is described. The non-transitory computer-readable medium may include instructions operable to cause a processor to receive, by an endpoint agent running on an endpoint device, an indication from an operating system of the endpoint device that the operating system has received authentication credentials from a user, obtain, by the endpoint agent, the authentication credentials from the operating system of the endpoint device, detect, by the endpoint agent, a change between the authentication credentials obtained from the operating system and a previous version of the authentication credentials, transmit the obtained set of authentication credentials over a secure connection to a central server based on the detected change, and wherein the endpoint agent is separate from the operating system.

Some examples of the method, system, or non-transitory computer-readable medium described above may further include processes, features, means, or instructions for transmitting a request for access to an information technology (IT) resource requiring authentication of the user. Some examples of the method, system, or non-transitory computer-readable medium described above may further include processes, features, means, or instructions for obtaining access to the IT resource for the user based at least in part on the transmitted request for access and the transmitted set of authentication credentials.

In some examples of the method, system, or non-transitory computer-readable medium described above, the IT resource may be managed by a third party entity separate from the central server. In some examples of the method, system, or non-transitory computer-readable medium described above, the IT resource comprises at least one of an application, a server, or network infrastructure gear. In some examples of the method, system, or non-transitory computer-readable medium described above, the secure connection comprises a two-way trust connection. In some examples of the method, system, or non-transitory computer-readable medium described above, the secure connection may be further based on an identification of the endpoint agent.

Some examples of the method, system, or non-transitory computer-readable medium described above may further include processes, features, means, or instructions for receiving a set of inputs from an administrator requiring the set of authentication credentials to satisfy a set of authentication security thresholds.

A method of secure credential management is described. The method may include receiving a set of authentication credentials at a central server from an endpoint agent running on an endpoint device, wherein the received set of authentication credentials are inputted by a user to an operating system of the endpoint device, wherein the endpoint agent is separate from the operating system, detecting, by the central server, a change between the authentication credentials received from the endpoint agent and a previous version of the authentication credentials, and transmitting the received set of authentication credentials to an information technology (IT) resource which requires user authentication to grant to the user access to the IT resource.

A system for secure credential management is also described. The system may include a processor, memory in electronic communication with the processor, instructions stored in the memory and operable, when executed by the processor, implement a central server configured to: receive a set of authentication credentials at a central server from an endpoint agent running on an endpoint device, wherein the received set of authentication credentials are inputted by a user to an operating system of the endpoint device, wherein the endpoint agent is separate from the operating system, detect, by the central server, a change between the authentication credentials received from the endpoint agent and a previous version of the authentication credentials, and transmit the received set of authentication credentials to an information technology (IT) resource which requires user authentication to grant to the user access to the IT resource.

A non-transitory computer-readable medium for secure credential management is described. The non-transitory computer-readable medium may include instructions operable to cause a processor to receive a set of authentication credentials at a central server from an endpoint agent running on an endpoint device, wherein the received set of authentication credentials are inputted by a user to an operating system of the endpoint device, wherein the endpoint agent is separate from the operating system, detect, by the central server, a change between the authentication credentials received from the endpoint agent and a previous version of the authentication credentials, and transmit the received set of authentication credentials to an information technology (IT) resource which requires user authentication to grant to the user access to the IT resource.

Some examples of the method, system, or non-transitory computer-readable medium described above may further include processes, features, means, or instructions for receiving a notification from the IT resource that a set of authentication credentials for the user stored by the IT resource may be replaced by the transmitted set of authentication credentials.

In some examples of the method, system, or non-transitory computer-readable medium described above, the detecting comprises: receiving a notification from the endpoint agent of the change between the authentication credentials obtained from the endpoint agent and the previous version of the authentication credentials. In some examples of the method, system, or non-transitory computer-readable medium described above, the IT resource may be managed by a third-party entity separate from the central server.

Some examples of the method, system, or non-transitory computer-readable medium described above may further include processes, features, means, or instructions for determining a protocol of the IT resource. Some examples of the method, system, or non-transitory computer-readable medium described above may further include processes, features, means, or instructions for translating the received set of authentication credentials to the determined protocol prior to the transmitting.

BRIEF DESCRIPTION OF THE DRAWINGS

Aspects of the disclosure are described with reference to the following figures.

DETAILED DESCRIPTION

Figure 1:
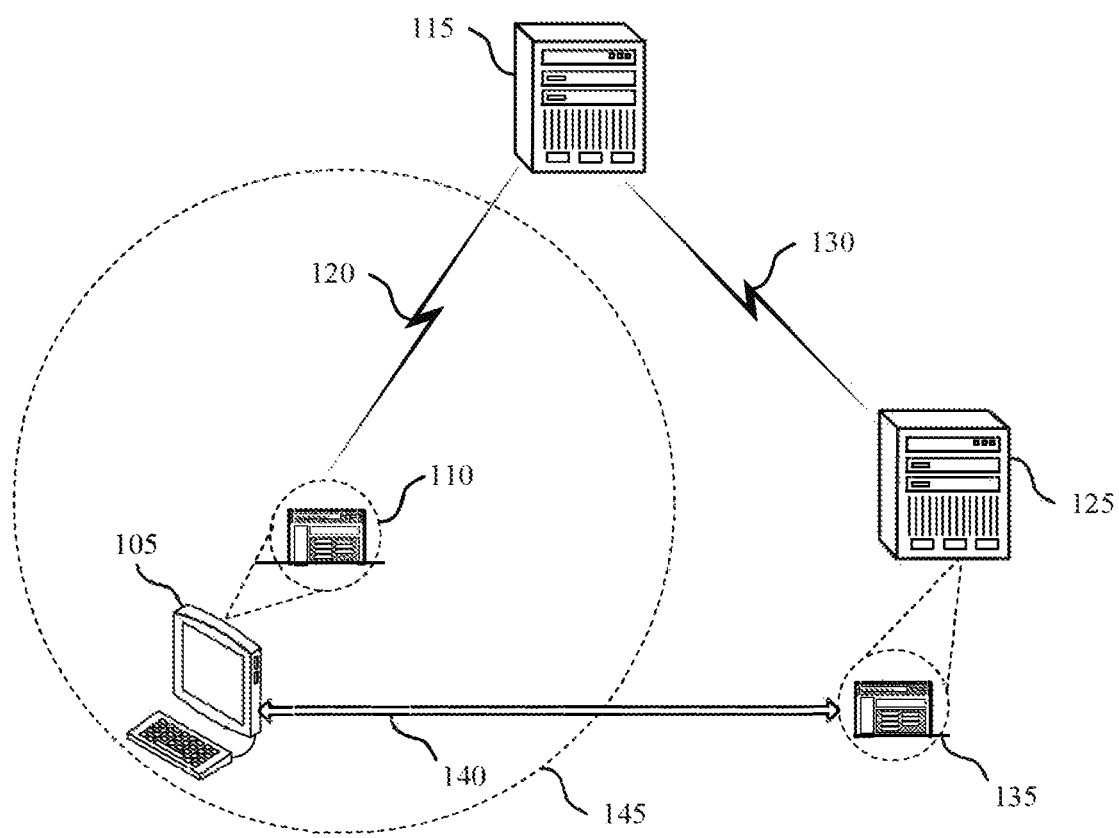
FIG. 1 illustrates an example of a system that supports secure endpoint authentication

A user in a closed network environment (e.g., a network inside a firewall), which may include a network accessible by authenticated, authorized devices or users, may have access to a multitude of information technology (IT) resources, which may include tools, processes, methodologies, and associated equipment employed to collect, process, and present information. However, some of these IT resources may not be managed within the closed network environment, and instead may be managed by third party entities such that each IT resource may implement its own unique user authentication procedures. In this case, it may be difficult for devices within the closed network to manage the various authentication credentials that these IT resources require for user authentication.

One solution for managing user authentication credentials is to update authentication credentials stored in a directory of the closed network. A user may sign into a device connected to the closed network, and the authentication credentials used to sign into the device are then passed to the directory. The directory may then update any authentication credentials stored within the directory with the authentication credentials used to sign into the device. However, a directory is limited to storing authentication credentials for IT resources managed or controlled by the closed network. That is, an IT resources that is managed or controlled by a third party entity, such as an application licensed for use by the closed network, may not have authentication credentials updated based on the user's signing into the device.

Another solution for managing authentication credential management is to allow for a single sign on session to federate authentication credentials to various IT resources. In this case, a browser plug in housed in the device may be used to provide a single sign on connection, where authentication credentials for the user may be passed to various applications requiring user authentication. However, this method allows for authentication credential management at an application or a web layer, which may limit the type of IT resources the credentials may be passed to. Additionally, this method may create security risks, as the authentication credential management is performed by a third party and may allow for malicious entities to gain access to the authentication credentials passed at the application or web layer.

An endpoint agent, which may also be referred to as an "agent," housed in an endpoint device of a user, may allow for the user to securely transmit authentication credentials from the endpoint device to various IT resources the user has access to. For instance, a user may sign into an endpoint device by providing authentication credentials to an operating system of the endpoint device. The endpoint agent may detect a change in the authentication credentials, either by detecting a change in the authentication credentials as compared to previous authentication attempts or by detecting the authentication credentials are for an initial setup of the user for the endpoint device. Upon this detection, the endpoint agent may transmit the authentication credentials to a server external to the closed network infrastructure. In some cases, the server may be cloud-based. The connection for transmitting the credentials may be secure and may be based on the identity of the endpoint agent. Once received, the server may forward the authentication credentials to any IT resource that the user may have access to. The authentication credentials, both while transmitting to the server and to the IT resources, may be encrypted to further enhance security. The method may therefore provide a seamless process for authentication credential management that maintains a high level of security as well to allow for transmitting the authentication credentials to any IT resource regardless of location, provider, platform, or protocol.

Aspects of the disclosure are initially described below in the context of a system that supports secure endpoint authentication credential control. Various examples of secure endpoint authentication credential control, an endpoint device, and a central server are then described. These and other aspects of the disclosure are further illustrated by and described with reference to apparatus diagrams, system diagrams, and flowcharts that relate to server-initiated secure sessions.

FIG. 1 illustrates an example of a system 100 that supports secure endpoint credential control in accordance with various aspects of the present disclosure. The system 100 includes an endpoint device 105, which a user may use to access the system 100. An example of the endpoint device 105 is described in more detail with reference to FIG. 3. The endpoint device 105 may house an endpoint agent 110, which may be securely connected to central server 115. An example of the central server 115 is described in more detail with reference to FIG. 4. The central server 115 may be in communication with an IT resource server 125, which may manage an information technology (IT) resource 135, of which the user of the endpoint device 105 may attempt to access the IT resource 135 with the endpoint device 105. In some examples, the IT resource 135 may be independent from the IT resource server 125, or the IT resource server 125 may comprise the IT resource 135.

The endpoint device 105 may provide a user with access to the system 100. The endpoint device 105 may include computing devices of various types (e.g., mobile phones, tablets, notebook computers, desktop computers, servers, etc.), which may utilize various operating systems.

The endpoint device 105 may also be a part of a closed network 145 (e.g., an intranet network), which may be a subset of system 100. The closed network 145 may be a private network which may be accessible by authorized users and authorized devices. A user may operate the endpoint device 105 in an attempt to access IT resources provided in system 100. An operating system of the endpoint device 105 may require authentication of a user before the user has access to the endpoint device 105. Authenticating the user may involve receiving authentication credentials (e.g., username, password, certificates, biometrics, etc.) from the user.

The endpoint device 105 may house an endpoint agent 110. The endpoint agent 110 may be background software (e.g., a software daemon) or a background service. This may enable the endpoint agent 110 to run as a background process (e.g., as a root process). This may further facilitate communication between the endpoint agent 110 and the operating system of the endpoint device 105.

Alternatively, the endpoint agent 110 may interface with the user of the endpoint device 105 to receive the authentication credentials (e.g., via an authentication credential write back process). For example, a user may provide authentication credentials directly to the endpoint agent 110 in an attempt to gain access to the endpoint device 105. The endpoint agent 110 may perform a write back procedure to further provide the authentication credentials to the operating system of the endpoint device 105. In this example, the endpoint agent 105 may receive the authentication credentials directly from the user and without the need to obtain access to the operating system. In some cases, the endpoint may include a user interface (UI), which may allow a user of the endpoint device 105 to access and manage the endpoint agent 110.

The endpoint agent 110 may detect the authentication credentials received for a user to gain access to the endpoint device 105. In some cases, the authentication credentials may be received from the operating system of the endpoint device 105. The endpoint agent 110 may have access (e.g., via an event system process, such as a hooking process, a push or pull process, etc.) to notifications of authentication credentials received by the operating system. Upon activation, the endpoint agent 110 may access the operating system (e.g., via registering with a hooking process) to receive the authentication credentials. Alternatively, the operating system may transmit the authentication credentials via a push procedure to the endpoint agent 110 upon reception of the authentication credentials. Alternatively, the endpoint agent 110 may periodically or aperiodically poll (e.g., via a pull procedure) the operating system for transmission of authentication credentials. Alternatively, the authentication credentials may be received by an application in lieu of the operating system, where the application transmits the authentication credentials to the operating system, the endpoint agent 110, or both. In some cases, the endpoint agent 110 may have access to notifications of authentication credentials received by the application similar to the endpoint agent's 110 accessing the operating system discussed above. The endpoint agent 110 may receive a plain text version of the authentication credentials from the operating system or the application. In some cases, the endpoint agent 110 may determine that the authentication credentials received are an updated version of authentication credentials for the user. In some cases, the endpoint agent 110 may make this determination by comparing the received authentication credentials to stored credentials for the user. The stored credentials may be stored by the endpoint agent 110, the operating system, the endpoint device 105, or any server which the endpoint device 105 may have a connection to. In some cases, an updated version of authentication credentials may include authentication credentials for an initial setup for a user, where the endpoint agent 110 may determine that the user is a new user of the endpoint device 105 based on identifying no previous authentication credentials for the user.

Based on this determination, the endpoint agent 110 may transmit the received authentication credentials to the central server 115 over a secure connection 120. In some cases, the central server 115 may be a cloud-based server. Additionally or alternatively, the central server 115 may be outside of the closed network 145 (e.g., not behind a firewall). The secure connection may include a two-way trust connection, and may be based on a certificate held by the endpoint agent 110. Additionally or alternatively, the secure connection may be based on an identification of the endpoint agent 110.

The transmission of the authentication credentials may be based on the capabilities or requirements of the IT resource 135. For example, in some cases, the IT resource 135 may be unable to receive hashed or salted authentication credentials from the endpoint agent 110. This may be due to an incompatibility of hashing or salting procedures at the endpoint agent 110 with hashing or salting procedures at the IT resource 135. In these cases, the endpoint agent 110 may transmit the authentication credentials over an encrypted connection to the central server 115.

The central server 115 may receive the authentication credentials from the endpoint agent 110 and may determine that the authentication credentials are updated or new authentication credentials for a user of the endpoint device 105. In some cases, the central server 115 may make this determination based on a received communication from the endpoint device 105 indicating that the authentication credentials are updated authentication credentials. In some cases, the central server 115 may make this determination based on comparing the authentication credentials to previous authentication credentials stored by the central server for the user.

In the case of the IT resource being outside of the closed network 145, the central server 115 may be an authorized entity for communicating with the IT resource server 125, and vice versa. For example, the managing entity (e.g., JumpCloud) of the central server 115 may grant access to the IT resource. The central server 115 may receive a certificate for identification purposes, or the central server may provide some other form of identification to the IT resource server 125 in order to establish communications with the IT resource server 125 over a secure connection.

Additionally, the central server 115 may store attributes related to the IT resource 135 based on its communications with the IT resource server 125. The central server 115 may request these attributes from the IT resource server 125. In some cases, the attributes may be a part of a protocol (e.g., SAML, LDAP, etc.) used by the IT resource 135 or a set of authentication credential rules enforced by the IT resource 135.

The central server 115 may then, based on the determination that the received authentication credentials are new or updated authentication credentials for the user, transmit the authentication credentials, via an encrypted or otherwise secure connection 130, to the IT resource server 125 which manages the IT resource 135. Based on the stored attributes of the IT resource 135 at the central server 115, the central server 115 may, in some cases, convert the authentication credentials to conform to a protocol used by the IT resource server 125. Additionally or alternatively, the central server 115 may hash, salt, or encrypt the authentication credentials before transmission to increase the security of the transmission.

In some cases, the central server may normalize the authentication credentials for a user prior to transmission of the authentication credentials. The central server 115 may have stored authentication credentials rules employed by the IT resource server 125 for access to the IT resource 135. For example, the IT resource 135 may require a username of a user to include a certain set of characters or symbols. Based on these stored authentication credential rules, the central server 115 may convert the received authentication credentials into a format that complies with rules employed by the IT resource server 125. For example, the central server 115 may truncate or augment a username, password, or other authentication credential of the user to comply with rules employed by the IT resource server 125.

Alternatively, the IT resource server 125 may be within the closed network 145. The IT resource server 125 may manage the IT resource 135, including which users and/or devices that may access the IT resource 135, and host the IT resource 135 within the closed network 145. The IT resource server 125 may store a list of authenticated users and their associated authentication credentials in order to access the IT resource 135. The IT resource server 125 may receive the authentication credentials from the central server 115 and update the authentication credentials for the user. Subsequently, the IT resource server 125 may transmit a notification to the central server 115, the endpoint agent 110, or both, indicating that the authentication credentials associated with a user and stored by the IT resource server 125 are updated to the authentication credentials received from the central server 115. In some cases, the IT resource server 125 may include a machine which may manage the IT resource. Alternatively, the functions of the IT resource server 125 may be performed by the IT resource 135.

After the user is logged into the endpoint device 105, the user may then access the IT resource 135 based on the transmitted authentication credentials from the endpoint agent 110. The user may direct the endpoint device 105 to access the IT resource 135, such as through a browser application or through a directory command. The endpoint device 105 may subsequently transmit a request to access to the IT resource server 125 of the IT resource 135. In some cases, the request for access may be transmitted to the central server 115 and may be rerouted to the IT resource server 125 or the IT resource 135. The user may be prompted to provide authentication credentials to access the IT resource 135, and the user may input the updated authentication credentials used to access the endpoint device 105 into the endpoint device 105, where the endpoint device 105 may then transmit the authentication credentials to the IT resource 135 or the IT resource server 125. In some cases, the authentication credentials may be transmitted to the central server 115 and may be rerouted to the IT resource server 125 or the IT resource 135. Additionally or alternatively, the central server 115 may store the updated authentication credentials for the user, and may transmit the authentication credentials to the IT resource 135 or the IT resource server 125 based on detecting the prompt to provide authentication credentials. In some cases, the central server 115 may convert the authentication credentials into a protocol used by the IT resource 135 or the IT resource server 125. Upon verifying the authentication credentials, the IT resource 135 or the IT resource server 125 may grant access for the user to the IT resource 135. Thus, authentication credentials for a user to access the IT resource 135 may be updated automatically, securely, and regardless of what entity manages the IT resource 135.

The system 100 may also allow for authentication credential updating or setting for another endpoint device based on user input received from a first endpoint device. In some cases, the IT resource server 125 may be another endpoint device which houses another endpoint agent. The central server 115 may determine that the user has access to this another endpoint device, and based on determining the received authentication credentials are new or updated authentication credentials, may update the authentication credentials for the user to access the other endpoint device via a secure connection to the other endpoint agent. The central server 115 may determine the user has access to the other endpoint device based on user attributes stored by the central server 115. The central server 115 may store authentication credentials associated with the user, as well as the origination point (e.g., which endpoint device) the authentication credentials are provided from. In another case, an administrator may provide a set of endpoint devices the user is authorized to access. Additionally or alternatively, the secure connection between the other endpoint agent and the central server 115 may be based on an identification of the other endpoint agent. Additionally or alternatively, the update may be performed by the central server 115 (e.g., a request to update message), or alternatively, the central server 115 may wait until the other endpoint agent contacts the central server 115 (e.g., when the other endpoint agent attempts to update or set authentication credentials for another user).

The various elements of the system 100, or the devices, components, and elements of the system 100 may be coupled to one another and/or may be in electronic communication with one another. As used herein, "in electronic communication" means a relationship between components that facilitates an exchange of information, signals, waveforms, electrons, and the like.

The various elements, components, servers and devices of the system 100 may be connected to one another wirelessly or with wired connections. In some cases, they are connected via the Internet. Communication between the various devices may utilize Transport Layer Security (TLS), Secure Sockets Layer (SSL), or some other security or encryption protocol. As used herein, the term server refers to a computer or program in a network that provides services, including access to applications, files, peripherals, etc., to other computers or programs, or consoles within a network. As discussed below, this may include both software and hardware, and real and virtual machines. In some examples, a server is a computer program that operates to support or perform tasks on behalf of other programs, computers, or users. Further, as used herein, a server may include a "rack" or enclosure housing computer hardware and software.

The system 100 may thus support secure endpoint authentication credential control. This may be accomplished, in part, with an agent hosted in an endpoint device, which may facilitate authentication credential transmission to a central server for authentication credential updating or setting for IT resources.

Figure 2:
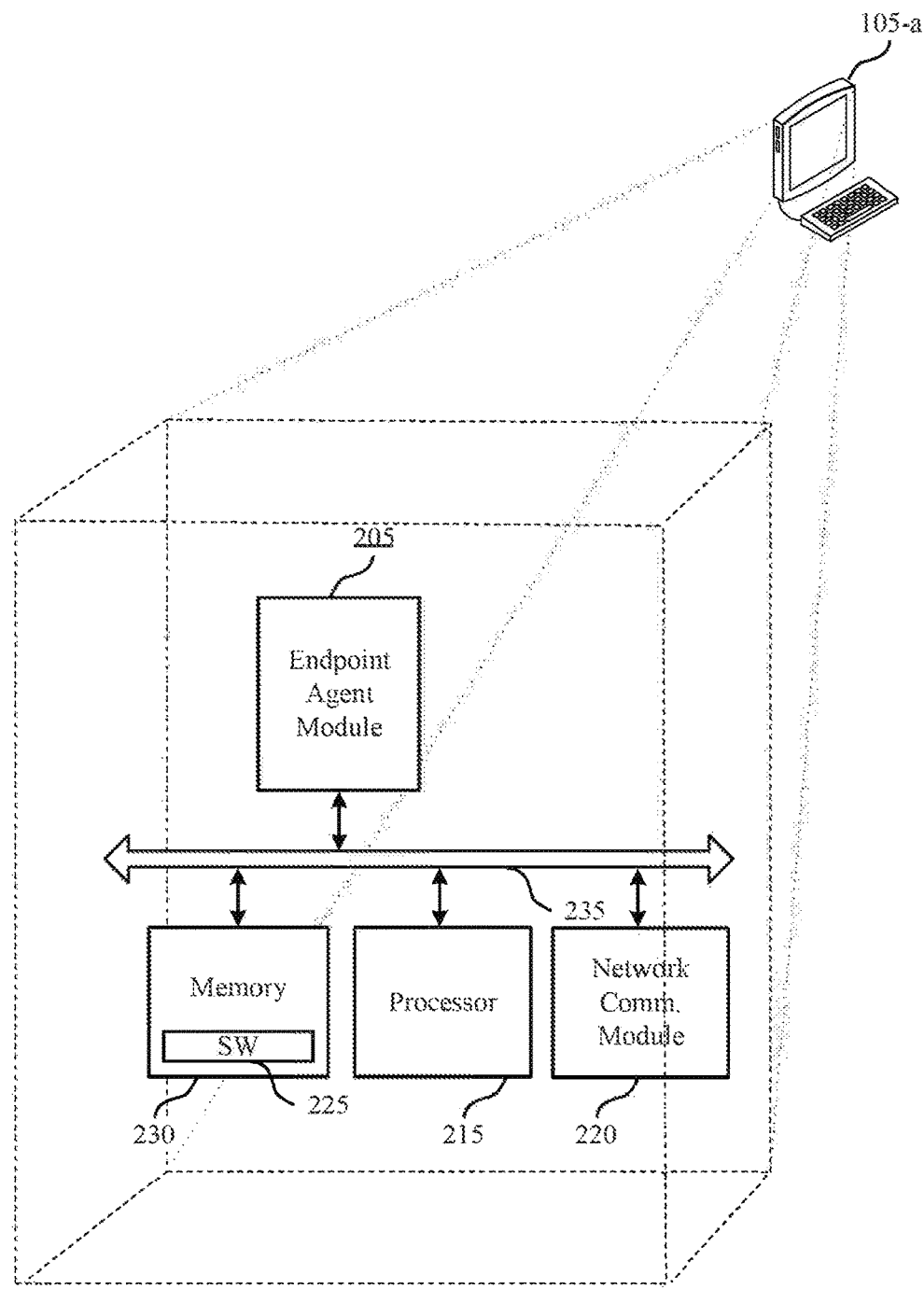
FIG. 2 illustrates an example of an endpoint device that supports secure endpoint authentication credential control in accordance with various aspects of the present disclosure.

FIG. 2 illustrates an example 200 of an endpoint device 105-a that supports secure endpoint authentication credential control in accordance with various aspects of the present disclosure. The endpoint device 105-a may be an example of the endpoint device 105 described with reference to FIG. 1, and may include an endpoint agent module 205.

The endpoint agent module 205 may detect that authentication credentials inputted into an operating system include new or updated authentication credentials and, in combination with other components of the endpoint device 105-a, assist in transmitting the authentication credentials to a central server, transmitting the authentication credentials to a server managing the IT resource, and gaining access to the IT resource based on the transmitted authentication credentials, as described with reference to FIG. 1.

The endpoint device 105-a may include a processor 215, memory 230 (including software/firmware (SW) 225), and a network communications module 220. The various modules of the endpoint device 105-a may be in communication via one or more buses 235. The network communications module 220 may be configured for secure, bi-directional communication with other devices, servers, and the like in a system, such as the system 100 of FIG. 1, via one or more wired or wireless links. For example, the network communications module 220 may include a modem configured to modulate packets and transmit them to, and to demodulate received packets.

The memory 230 may include random access memory (RAM) and read only memory (ROM). The memory 230 may store computer-readable, computer-executable software/firmware code 225, including instructions that, when executed, cause the processor 215 to perform various functions described herein (e.g., facilitating secure authentication credential control). Alternatively, the software/firmware code 225 may not be directly executable by the processor 215 but cause a computer (e.g., when compiled and executed) to perform functions described herein. The processor 215 may include an intelligent hardware device, (e.g., a central processing unit (CPU), a microcontroller, an ASIC, etc.).

In some cases, the endpoint agent module 205 may include special-purpose software, such as SW 225, within the memory 230. In some cases, the endpoint agent module 205 may be an extension or a component of an operating system running on the endpoint device 105-a. In other cases, the endpoint agent module 205 may be an application running on top of the operating system of the endpoint device 105-a. In other cases, the endpoint agent module 205 may be firmware running on a special-purpose hardware device.

Figure 3:
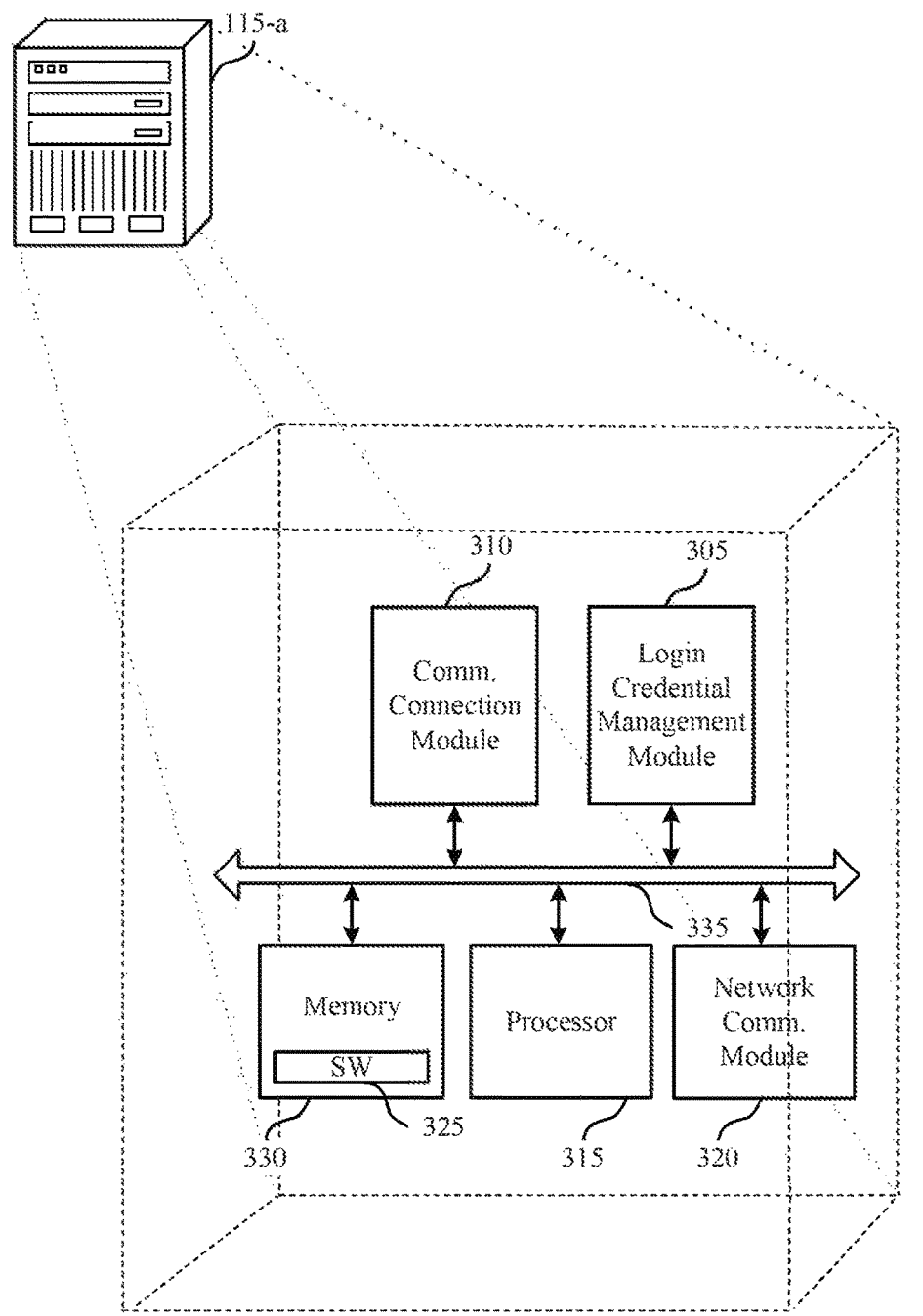
FIG. 3 illustrates an example of a central server that supports secure endpoint authentication credential control in accordance with various aspects of the present disclosure.

FIG. 3 illustrates an example 300 of a central server 115-a that supports secure endpoint authentication credential control in accordance with various aspects of the present disclosure. The central server 115-a may be an example of the central server 115 with reference to FIG. 1, and may include an authentication credential management module 305 and a communication connection module 310.

The authentication credential management module 305 may facilitate secure endpoint authentication credential control as described with reference to FIG. 1. The authentication credential management module 305 may be a hardware module or a software module, or a combination of hardware and software (e.g., a special-purpose processor). The authentication credential management module 305 may, in some cases and in combination with other components of the central server 115-a, receive authentication credentials inputted by a user to an operating system of an endpoint device, determine the received authentication credentials include new or updated authentication credentials for the user, and transmit the received authentication credentials to a server which manages an IT resource which requires authentication for the user, as described with reference to FIG. 1. In some cases, the received authentication credentials are transmitted to a machine managing the IT resource, or to the IT resource itself, as described with reference to FIG. 1.

The communication connection module 310 may provide a secure connection between an endpoint agent of an endpoint device and the central server 115-a. Additionally, the communication connection module 310 may provide a connection between the central server 115-a and the server which manages the IT resource, as described with reference to FIG. 1.

The central server 115-a may include a processor 315, memory 330 (including software/firmware (SW) 325), and a network communications module 320. The various modules of the central server 115-a may be in communication via one or more buses 335. The network communications module 320 may be configured for secure, bi-directional communication with other devices, servers, and the like in a system, such as system 100 of FIG. 1, via one or more wired or wireless links. For example, the network communications module 320 may include a modem configured to modulate packets and transmit them to, and to demodulate received packets.

The memory 330 may include random access memory (RAM) and read only memory (ROM). The memory 330 may store computer-readable, computer-executable software/firmware code 325, including instructions that, when executed, cause the processor 315 to perform various functions described herein (e.g., facilitating secure endpoint credential control). Alternatively, the computer-readable, computer-executable software/firmware code 325 may not be directly executable by the processor 315 but cause a computer (e.g., when compiled and executed) to perform functions described herein. The processor 315 may include an intelligent hardware device, (e.g., a central processing unit (CPU), a microcontroller, an ASIC, etc.).

In some cases, the authentication credential management module 305, the communication connection module 310, or both, may be implemented by the computer-readable, computer-executable software/firmware code 325, within the memory 330. In some cases, the authentication credential management module 305, the communication connection module 310, or both, may be an extension or a component of an operating system running on the central server 115-a. In other cases, the authentication credential management module 305, the communication connection module 310, or both, may be application running on top of the operating system of the central server 115-a. In other cases, the authentication credential management module 305, the communication connection module 310, or both, may be firmware running on a special-purpose hardware device.

Figure 4:
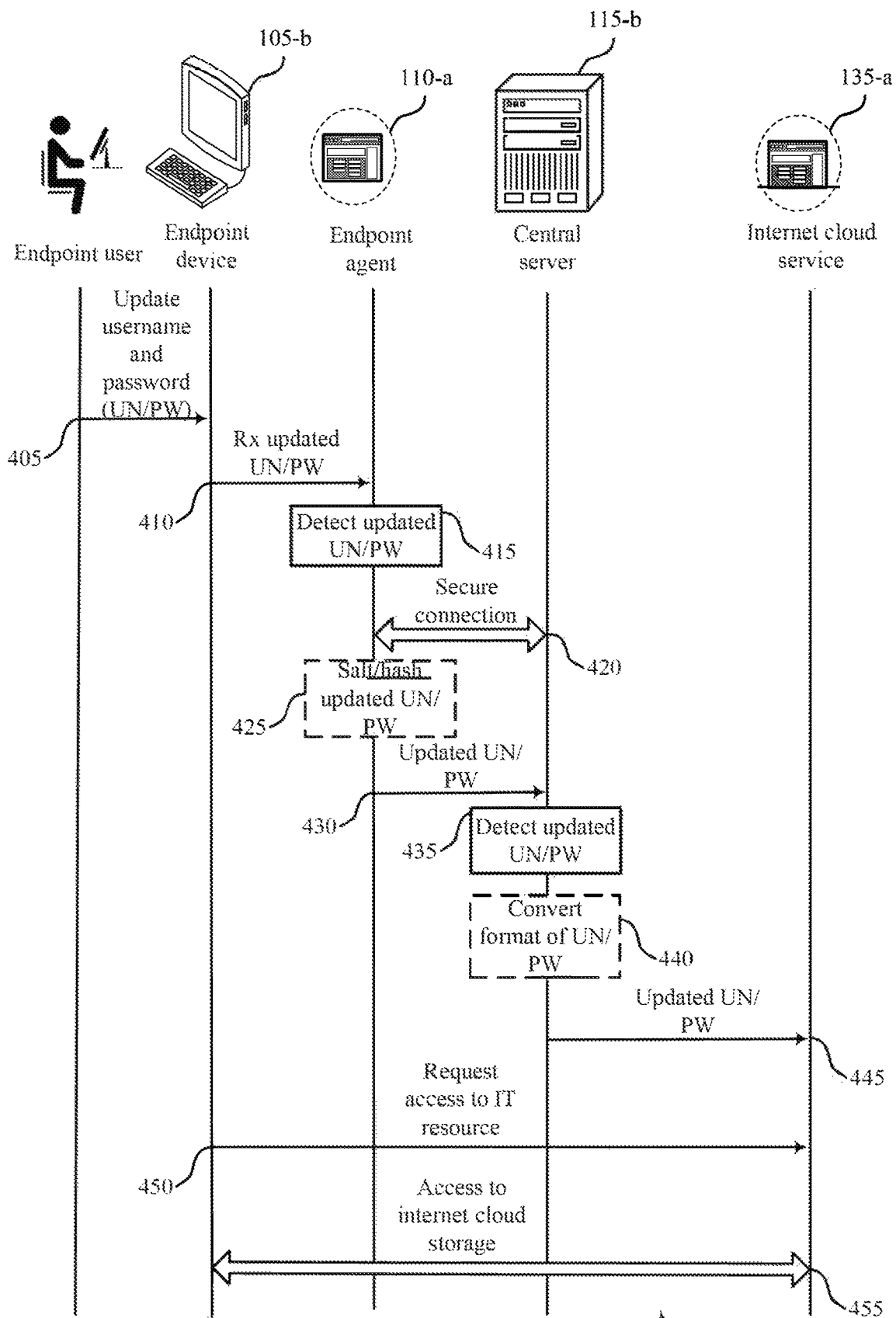
FIG. 4 illustrates an example of a process flow in a system that supports secure endpoint authentication credential control in accordance with various aspects of the present disclosure.

FIG. 4 illustrates an example of a process flow 400 in a system, such as system 100 of FIG. 1, that supports secure endpoint authentication credential control in accordance with various aspects of the present disclosure. The process flow 400 may include an endpoint device 105-b, an endpoint agent 110-a, a central server 115-b, and an internet cloud service 136. Each of these may be examples of corresponding devices, entities, and the like, described with reference to FIGS. 1-3. The internet cloud service 136 may be an example of the IT resource 135 as discussed with reference to FIG. 1-3.

At 405, a user logs into his or her endpoint device 105-b by providing his or her authentication credentials (e.g., username, password, biometrics, blockchain, etc.). The authentication credentials are input into the operating system of the endpoint device 105-b. For example, the user may provide the username and password into a startup window for the endpoint device 105-b. In some cases, the operating system may validate the inputted authentication credentials.

In some examples, the authentication credentials are inputted into the endpoint agent 110-a directly (e.g., an user interface (UI)), where the endpoint agent 110-a may subsequently transmit the authentication credentials to the operating system. In some cases, the authentication credentials may be inputted into a screen of the endpoint device 105-b (e.g., a username and password via typed keys or a touch screen). Additionally or alternatively, the authentication credentials may be inputted into the endpoint device 105-b as facial recognition information via a camera, or in some cases the authentication credentials may include a fingerprint inputted into a fingerprint reader of the endpoint device 105-b. Additionally or alternatively, the authentication credentials may be inputted into the endpoint device 105-b via near-field communication (NFC) hardware (e.g., a cell phone).

At 410, the endpoint agent 110-a may obtain the inputted authentication credentials from the operating system of the endpoint device 105-b. In some cases, the endpoint agent 110-a may obtain the inputted authentication credentials based in part on the operating system validating the inputted authentication credentials as described above. The endpoint device 105-b and the endpoint agent 110-a may be as described with reference to FIGS. 1 and 2.

At 415, the endpoint agent 110-a may compare the inputted authentication credentials with stored authentication credentials for the user. If the two sets of authentication credentials do not match, the endpoint agent 110-a may determine that a change to the user's authentication credentials has been made. In some cases, the endpoint agent 110-a may have no stored authentication credentials for the user, and may determine that the inputted authentication credentials are for a new user.

At 420, the endpoint agent 110-a may establish a secure connection with the central server 115-b. The connection may be established based at least in part on the identity of the endpoint agent.

Optionally, at 425, the endpoint agent 110-a may salt and hash the inputted authentication credentials. The decision of whether to salt and hash may be based on the compatibility of the internet cloud service 136. If the internet cloud service 136 capable of receiving and using salted and hashed versions of the authentication credentials, then the endpoint agent 110-a may hash and salt the authentication credentials. However, if the internet cloud service 136 is unable to use salted and hashed authentication credentials from the endpoint agent 110-a, then the endpoint agent 110-a may instead keep the authentication credentials in a plaintext form.

At 430, the endpoint agent 110-a may transmit the inputted authentication credentials over the established secure connection to a central server 115-*b* (e.g., a JumpCloud cloud management server). The secure connection may be encrypted.

At 435, the central server 115-*b* may compare the received authentication credentials with stored authentication credentials for the user. If the version of the authentication credentials received by the central server 115-*b* has been hashed and salted, the central server 115-*b* may compare the hashed and salted version of the authentication credentials for the user to a stored hashed and salted version of the authentication credentials. If the two sets of authentication credentials do not match, the central server 115-*b* may determine that a change to the user's authentication credentials has been made. In some cases, the central server 115-*b* may have no stored authentication credentials for the user, and may determine that the received authentication credentials are for a new user. In other cases, the central server 115-*b* may receive a message from the endpoint agent 110-*a* indicating that the received authentication credentials are updated or new. The central server 115-*b* may be described with reference to FIGS. 1 and 3.

Optionally, at 440, the central server 115-*b* may convert or normalize the received authentication credentials into a format used by the internet cloud service 136. For example the internet cloud service may require a username to include the internet cloud service's domain name as part of the username, (e.g, username@XYZ.com). Thus, the central server 115-*b* may normalize the username by appending the characters "@XYZ.com" to the username received from the endpoint agent 110-*a*. The central server 115-*b* may perform this normalization based on stored attributes for the internet cloud service 136 (e.g., the appended "@XYZ.com" character string", which may have been received in prior communications with the internet cloud service 136. The normalization process may include appending characters or data to one or more authentication credentials, truncating or removing characters or data from the one or more authentication credentials, scrambling characters or data in the one or more authentication credentials, or performing other deterministic functions on the received authentication credentials.

At 445, the central server 115-*b* may transmit the received authentication credentials to the internet cloud service 136. The internet cloud service 136 may use the authentication credentials to update the authentication credentials associated with the user for access to the internet cloud service 136.

At 450, the endpoint device 105-*b* may request access to the internet cloud service 136 for the user. For example, the user may explicitly or implicitly (e.g., by navigating to a website associated with the internet cloud service 136) direct the endpoint device 105-*b* to request access to the internet cloud service 136 via a website browser. The endpoint device 105-*b* may receive a prompt to input authentication credentials for the user. The user may input the updated or new authentication credentials previously inputted into the operating system, into the endpoint device 105-*b*. The internet cloud service 136 may compare the inputted authentication credentials to the authentication credentials received from the central server 115-*b*. At 455, the internet cloud service 136 may grant access to the endpoint device 105-*b* after verifying the authentication credentials received at step 445 matches the authentication credentials received from the central server 115-*b*. Alternatively, the endpoint agent 110-*a* may autonomously and seamlessly provide the updated authentication credentials to the internet cloud service 136 without requiring the user to enter his or her authentication credentials another time.

Figure 5:
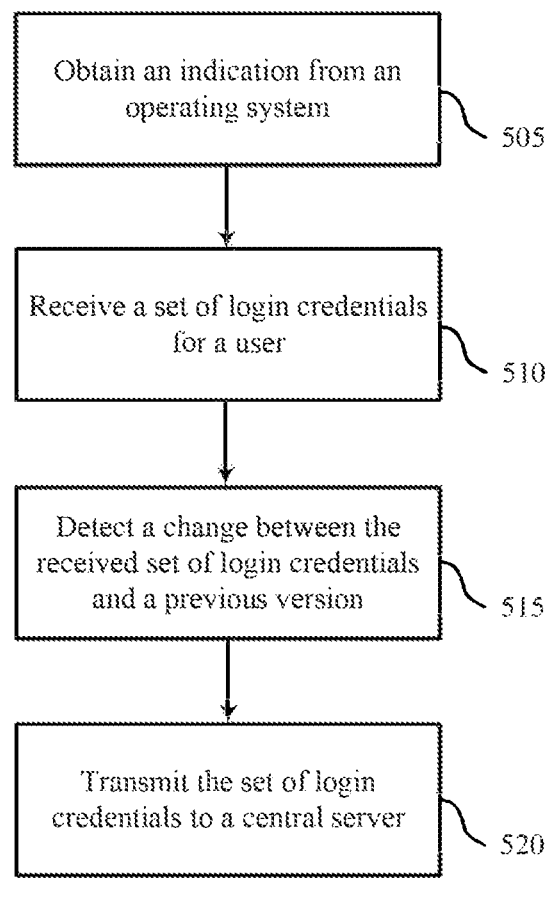
FIGS. 5 and 6 illustrate methods for secure endpoint authentication credential control in accordance with various aspects of the present disclosure.

FIG. 5 illustrates a method 500 for secure endpoint authentication credential control in accordance with various aspects of the present disclosure. The operations of the method 500 may be implemented by various servers and devices within a system, as described with reference to FIGS. 1-4. In some examples, one or more endpoint agents 110 may execute a set of codes to control the functional elements of servers and devices with the system 100 to perform the functions described below. Additionally or alternatively, the endpoint agent 110 may perform aspects of the functions described below using special-purpose hardware.

At block 505, the endpoint agent may receive an indication from an operating system of an endpoint device that the operating system has received authentication credentials from a user. The endpoint agent may be as described with reference to FIGS. 1 and 2 and may be installed on the endpoint device.

At block 510, the endpoint agent may obtain the authentication credentials from the operating system of the endpoint device. In some examples, the authentication credentials are obtained by an application in communication with the operating system.

At block 515, the endpoint agent may detect a change between the authentication credentials obtained from the operating system and a previous version of the authentication credentials. In some cases, the detection may include comparing the obtained authentication credentials to stored credentials for the user. Additionally or alternatively, the previous version of the authentication credentials may include no authentication credentials, and the detection may include determining the obtained authentication credentials include credentials for an initial setup for the user.

At block 520, the endpoint agent may transmit the obtained set of authentication credentials over a secure connection to a central server based on the detected change. In some examples, the secure connection may include a two-way trust connection, and may be made between the endpoint agent and a central server, which may be described with reference to FIGS. 1 and 3. In some examples, the secure connection may be made between the endpoint agent and an IT resource, the IT resource being described in detail with reference to FIGS. 1 and 4. In some examples, the secure connection may be further based on an identification of the endpoint agent.

Figure 6:
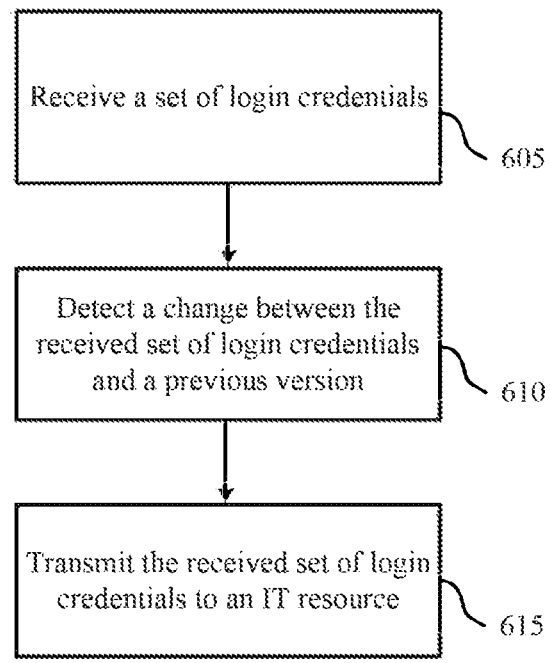

FIG. 6 illustrates a method 600 for secure endpoint authentication credential control in accordance with various aspects of the present disclosure. The operations of the method 600 may be implemented by various servers and devices within a system, as described with reference to FIGS. 1-4. In some examples, one or more central servers 115 may execute a set of codes to control the functional elements of servers and devices with the system 100 to perform the functions described below. Additionally or alternatively, the central server 115 may perform aspects of the functions described below using special-purpose hardware.

At block 605, the central server may receive a set of authentication credentials from an endpoint agent running on an endpoint device. The received set of authentication credentials may be inputted by a user to an operating system of the endpoint device. The endpoint agent may be separate from the operating system. The endpoint agent may be as described with reference to FIGS. 1 and 2 and may be installed on the endpoint device.

At block 610, the central server may detect a change between the authentication credentials received from the endpoint agent and a previous version of the authentication credentials. In some cases, the detection may include comparing the obtained authentication credentials to stored credentials for the user. Additionally or alternatively, the previous version of the authentication credentials may include no authentication credentials, and the detection may include determining the obtained authentication credentials include credentials for an initial setup for the user. In other examples, the detection may include receiving a notification from the endpoint agent of the change between the authentication credentials obtained from the endpoint agent and the previous version of the authentication credentials.

At block 615, the central server may transmit the received set of authentication credentials to an IT resource which requires user authentication to grant to the user access to the IT resource. The IT resource may be further described with reference to FIGS. 1 and 4. In some examples, the central server may receive a notification from the IT resource that a set of authentication credentials for the user stored by the IT resource is replaced by the transmitted set of authentication credentials.

Thus, the methods 500 and 600 may provide for secure endpoint authentication credential control. It should be noted that the methods 500 and 600 describe possible implementations, and that the operations and the steps may be rearranged or otherwise modified such that other implementations are possible. In some examples, aspects from two or more of the methods 500 and 600 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of secure credential management, comprising:
obtaining, by an endpoint agent running on an endpoint device separately from an operating system running on the endpoint device, current authentication credentials for a user that were inputted into the endpoint device and validated by the operating system of the endpoint device as giving the user access to the endpoint device;
detecting, by the endpoint agent, a difference between the current authentication credentials and prior authentication credentials for the user stored at the endpoint agent, the prior authentication credentials inputted into the endpoint device and validated by the operating system as giving the user access to the endpoint device before the current authentication credentials, wherein the current authentication credentials supersede the prior authentication credentials; and
transmitting, by the endpoint agent, the current authentication credentials to a central server based on detecting the difference, wherein transmitting the current authentication credentials to the central server triggers separately managed authentication credentials for the user to gain access to an information technology (IT) resource to be updated at the IT resource to match the current authentication credentials.

2. The method of claim 1, wherein obtaining the current authentication credentials comprises receiving, by the endpoint agent, the current authentication credentials from the operating system, the method further comprising:
determining the current authentication credentials were validated by the operating system based on receiving the current authentication credentials from the operating system.

3. The method of claim 1, wherein obtaining the current authentication credentials comprises receiving, at the endpoint agent, the current authentication credentials inputted into the endpoint device by the user, the method further comprising:
receiving, by the endpoint agent, an indication from the operating system that the current authentication credentials were validated by the operating system; and
determining, by the endpoint agent, that the current authentication credentials are valid based on the indication.

4. The method of claim 3, further comprising:
storing, by the endpoint agent, the current authentication credentials based on determining that the current authentication credentials are valid.

5. The method of claim 1, further comprising:
obtaining, by the endpoint agent, the prior authentication credentials before receiving the current authentication credentials.

6. The method of claim 5, wherein obtaining the prior authentication credentials comprises receiving the prior authentication credentials from the operating system, the method further comprising:
determining the prior authentication credentials were validated by the operating system based on receiving the prior authentication credentials from the operating system.

7. The method of claim 1, further comprising:
transmitting a request for access to the IT resource requiring authentication of the user; and
obtaining access to the IT resource for the user based on the request for access and the current authentication credentials.

8. The method of claim 1, further comprising:
receiving a set of inputs from an administrator requiring the current authentication credentials to satisfy a set of authentication security thresholds.

9. The method of claim 1, wherein the current authentication credentials and the prior authentication credentials were inputted into the endpoint device to gain the user access to the endpoint device and validated by the operating system to give the user access to the endpoint device.

10. The method of claim 1, wherein the separately managed authentication credentials match the prior authentication credentials before the current authentication credentials are transmitted to the central server.

11. A method of secure credential management at a central server, comprising:
receiving, from an endpoint agent running on an endpoint device separately from an operating system running on the endpoint device, current authentication credentials for a user that were inputted into the endpoint device and validated by the operating system of the endpoint device as giving the user access to the endpoint device;
detecting a difference between the current authentication credentials and prior authentication credentials for the user stored at the central server, the prior authentication credentials inputted into the endpoint device and validated by the operating system as giving the user access to the endpoint device before the current authentication credentials, wherein the current authentication credentials supersede the prior authentication credentials; and
transmitting the current authentication credentials to an information technology (IT) resource based on detecting the difference, wherein transmitting the current authentication credentials to the IT resource triggers separately managed authentication credentials for the user to gain access to the IT resource to be updated at the IT resource to match the current authentication credentials.

12. The method of claim 11, further comprising:
receiving, from the IT resource, a notification that the separately managed authentication credentials for the user stored by the IT resource are replaced by the current authentication credentials based on transmitting the current authentication credentials to the IT resource.

13. The method of claim 11, further comprising:
determining a protocol of the IT resource; and
translating the current authentication credentials to the protocol of the IT resource prior to the transmitting.

14. The method of claim 11, further comprising:
receiving a set of inputs from an administrator requiring the current authentication credentials to satisfy a set of authentication security thresholds.

15. An endpoint device for secure credential management, comprising:
a processor;
memory coupled with the processor; and instructions stored in the memory and executable by the processor to cause an endpoint agent running on the endpoint device to:
  obtain current authentication credentials for a user that were inputted into the endpoint device and validated by an operating system of the endpoint device as giving the user access to the endpoint device;
  detect a difference between the current authentication credentials and prior authentication credentials for the user stored at the endpoint agent, the prior authentication credentials inputted into the endpoint device and validated by the operating system as giving the user access to the endpoint device before the current authentication credentials, wherein the current authentication credentials supersede the prior authentication credentials; and
  transmit the current authentication credentials to a central server based on detecting the difference, wherein transmitting the current authentication credentials to the central server triggers separately managed authentication credentials for the user to gain access to an information technology (IT) resource to be updated at the IT resource to match the current authentication credentials,
wherein the endpoint agent runs on the endpoint device separately from the operating system.

16. The endpoint device of claim 15, wherein the instructions to obtain the current authentication credentials are further executable by the processor to cause the endpoint agent to receive the current authentication credentials from the operating system, and wherein the instructions are further executable by the processor to cause the endpoint agent to:
  determine the current authentication credentials were validated by the operating system based on receiving the current authentication credentials from the operating system.

17. The endpoint device of claim 15, wherein the instructions are further executable by the processor to cause the endpoint agent to:
  transmit a request for access to the IT resource requiring authentication of the user; and
  obtain access to the IT resource for the user based on the request for access and the current authentication credentials.

18. The endpoint device of claim 15, wherein the instructions are further executable by the processor to cause the endpoint agent to:
  receive a set of inputs from an administrator requiring the current authentication credentials to satisfy a set of authentication security thresholds.

* * * * *